Dec. 24, 1940.  R. CADWALLADER  2,225,976
MOTOR VEHICLE BODY
Filed April 11, 1939    5 Sheets-Sheet 1

INVENTOR
Robert Cadwallader.
BY
Harness, Lind, Patee & Harris
ATTORNEYS.

Dec. 24, 1940.　　　R. CADWALLADER　　　2,225,976

MOTOR VEHICLE BODY

Filed April 11, 1939　　　5 Sheets-Sheet 3

INVENTOR.
Robert Cadwallader.
BY Harness, Dind, Patee+Harris
ATTORNEYS.

Dec. 24, 1940.  R. CADWALLADER  2,225,976
MOTOR VEHICLE BODY
Filed April 11, 1939  5 Sheets-Sheet 4

INVENTOR.
Robert Cadwallader.
BY Harness, Lind, Pates & Harris
ATTORNEYS.

Patented Dec. 24, 1940

2,225,976

UNITED STATES PATENT OFFICE 2,225,976

MOTOR VEHICLE BODY

Robert Cadwallader, Detroit, Mich., assignor to Chrysler Corporation, Highland Park, Mich., a corporation of Delaware Application April 11, 1939, Serial No. 267,252

10 Claims. (Cl. 296—28)

This invention relates to motor vehicles and refers more particularly to improvements in body structures of motor vehicles.

It is an object of my invention to provide a motor vehicle body structure having improved characteristics of strength and rigidity.

A further object of my invention is to provide a body structure fabricated in an improved manner from steel panels, steel rails, channels, braces and the like, connected together to provide a substantially unitary rigid structure having improved strength and durability.

Another object of my invention in a more limited aspect thereof is to provide an improved body structure having the component parts thereof largely connected by welding.

Another of object is to provide a body of such strength and rigidity that the conventional chassis frame is rendered unnecessary and the running gear of the vehicle is mounted directly on the body.

Another object of my invention is to provide a body structure of relatively great strength and rigidity for the weight thereof.

Another object of my invention is to provide a body structure made up of steel panels welded together to form a rigid structure which requires no internal framing, the stresses incident to use of said body being taken by the body paneling or "skin."

Further objects of my invention are to provide a body comprising an improved truss-like structure; to provide a body structure fabricated in an improved manner to afford relatively great strength accompanied by improved stress distribution between the structural body parts, and freedom from rattle or wearing between the component body parts; and to provide an improved steel body structure adapted for manufacture at relatively low cost commensurate with the advantages obtained by reason of my construction.

An additional object of my invention is to provide a truss-like body structure adapted to efficiently distribute the stresses throughout the body incident to its weight and to the loads applied thereto from the ground wheels.

A further object of my invention in its more limited aspects is to provide a body structure fabricated in a novel manner from pre-formed, built-up or assembled main body panels or subassembly units.

Further features of my invention relate to the provision of novel relatively strong, durable and efficient joint structures or connections between the various component parts of my body structure; to the provision of improved means for utilizing the plates, panels, or shells of the body structure to carry a portion of the stresses; and to the provision of improved means for bracing the body parts.

Further objects and advantages of my invention will be more apparent from the following illustrative embodiments thereof, reference being had to the accompanying drawings, in which:

Fig. 3 is a plan view of the floor section of the body taken along the line 3—3 of Figs. 1 and 2.

Fig. 8 is a section along the line 8—8 of Fig. 2 showing the construction of the rear quarter panel around the window opening.

Fig. 12 is a section along the line 12—12 of Fig. 2.

Figure 1:
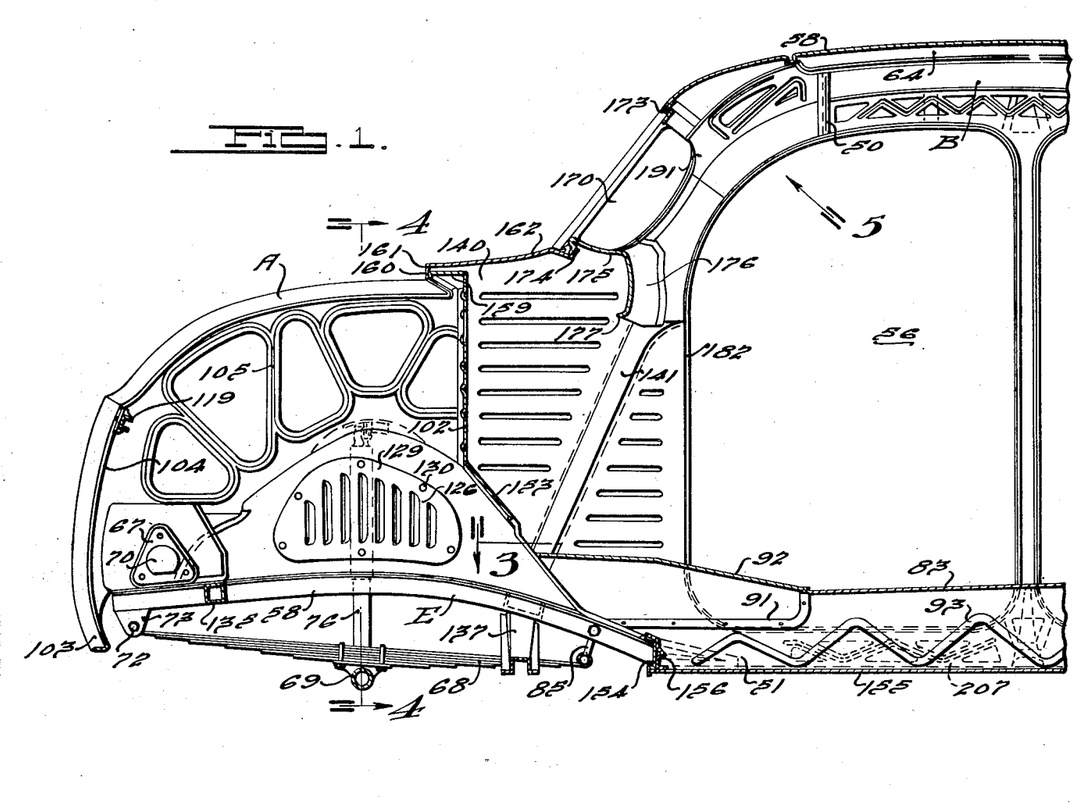
Fig. 1 is a longitudinal sectional elevational view of the forward portion of my novel body as seen from the inside thereof.
Figures 2, 16:
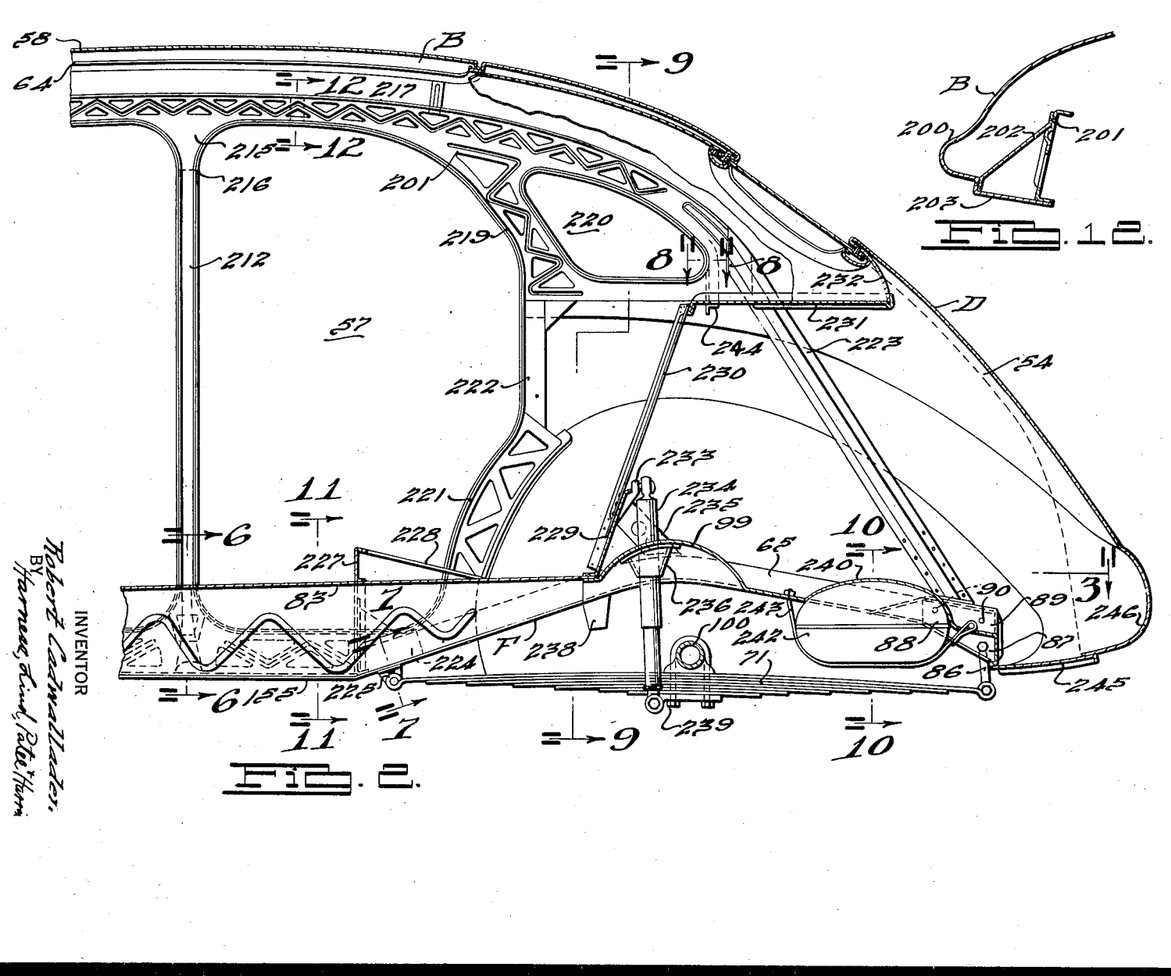
Fig. 2 is a view similar to Fig. 1, but of the rear portion of the body.

Referring to the drawings, I have illustrated my invention in connection with a motor vehicle body of the enclosed type which, for a four-door sedan, may have the general configuration shown in Figs. 1 and 2. It will be understood that, in its broader aspects, my invention is not limited to any particular appearance, style or shape of the body or the motor vehicle as a whole as these may vary within wide limits according to preference.

My body structure is, in general, of all-steel unitary construction fabricated from steel panels, shells or the like, pressed steel rails, channels, columns, plates and braces. The component parts are preferably for the most part welded into one unitary rigid structure of improved strength and durability. I prefer to largely weld the component parts of the body structure since, among other advantages, the welding provides permanence of assembly, relatively great strength accompanied by efficient stress transference between the welded parts, freedom from rattle or wearing between the various parts and reduction in weight and manufacturing cost of the body structure as a whole.

In some instances, as will be presently more apparent, I have connected certain parts of the structure with rivets, bolts or the like, particularly where removal of such parts for inspection, servicing or replacement renders the use of non-welded fastening means desirable. In other instances, rivets or bolts are employed to facilitate the final assembly of certain main assemblies to other main structures and I desire to point out that, in the broader aspects of my invention, I do not limit my invention to the particular type of connecting means hereinafter more particularly described in order to illustrate one concrete form which my invention may assume, it being readily apparent that other fastening means may be employed as desired.

In general, according to the illustrated preferred embodiments of the principles of my invention, I have provided a body construction which is fabricated from a plurality of preformed, built-up or assembled main body panels or sub-assembly units although, if desired, the entire body structure may be fabricated or built-up without first providing the aforesaid preformed main panels of sub-assemblies and the like. I prefer, however, according to one novel feature of my invention, to provide such preformed main structures as the manufacture, assembly and servicing of the body structure is greatly facilitated thereby. In practice, these main panels or sub-assemblies may vary, as desired, both in the number of such main component panels or sub-assembly structures and in the formation of the structural parts thereof within keeping of the broader principles of my invention.

According to the illustrated embodiment of my invention, the body structure shown in Figs. 1 and 2 is preferably formed of four main structural portions adapted to be welded together to form a rigid unitary body structure, such main portions comprising the body front sections A, the body side panels B and C and the body rear panel D.

Figures 2, 5, 6, 7:
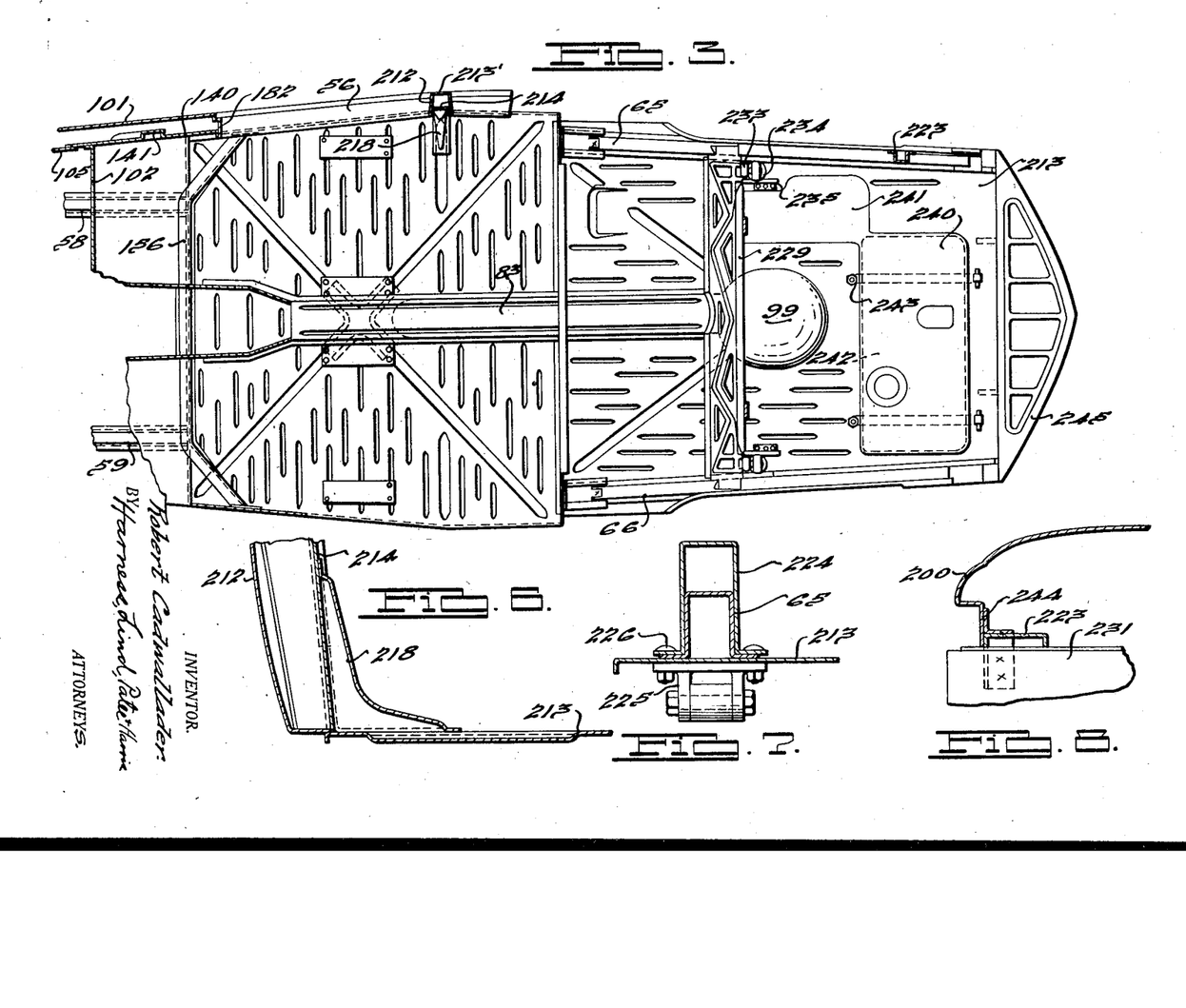
Fig. 5 is a view of the corner construction in the region of the front post and roof joint, the position of which is indicated by the arrow 5 in Fig. 1.
Fig. 6 is a section along line 6—6 of Fig. 2 showing the construction at the bottom of the B post.
Fig. 7 is a section along the line 7—7 of Fig. 2 showing the double channel sill construction in the region of the spring pivot bolt.
Figure 4:
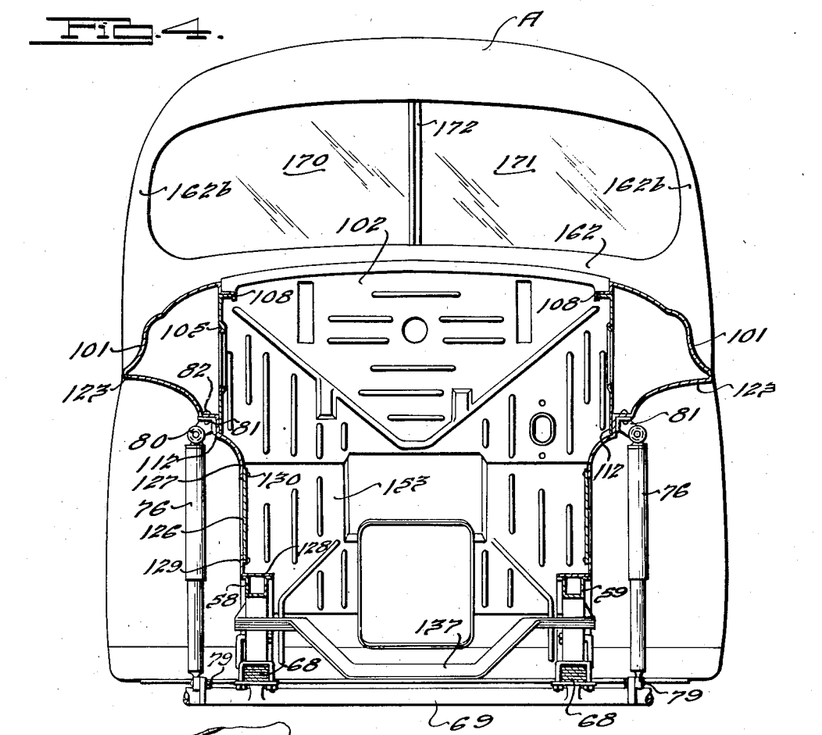
Fig. 4 is a view, partly in section, of the cowl portion of the body taken along the line 4—4 of Fig. 1.
Figure 5:
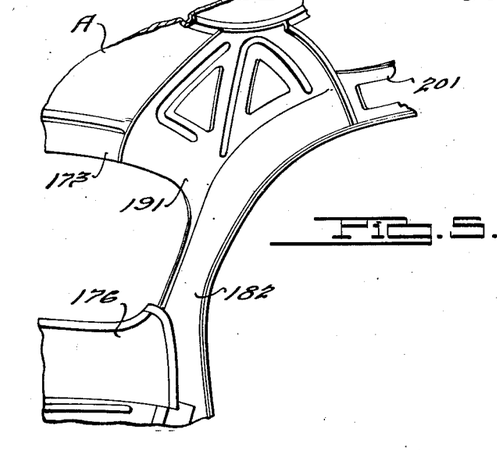

The front section A, as will be apparent from Figs. 1, 4 and 5 is connected by welding to the side panel B as generally indicated at 50 and 51 and to the other side panel C in a similar manner at corresponding points. The side panels B and C are connected by welding to the rear panel D along the downwardly meeting edges of the side and rear panels as indicated at 54.

It will be understood that the various welded joints do not appear when the finished body is viewed since the external welds are covered by the usual enamel-like paint and the internal welds which are not otherwise hidden from view by the body structure itself are covered by the interior trim and finish customarily employed in general body practice or else by paint or other finish panels as desired. My invention is more particularly directed to the body structure and the details of the trim, finish and the like will, for the most part, be omitted from my disclosure.

In practice, any type of welding may be employed which is best suited to the particular joint or connection dealt with and I have found it expedient to employ flash-welds, butt-welds, arc-welds and gas-welds at different points in the structure.

Thus, by way of example, in the assembly the side panels B and C are flash-welded along the rear panel edge joints 54 and then joined in a unit to the front section A. Where the front section A meets the side panels B and C at the open ends, the header joints 50 at the top are flash-welded on the outside and are welded on the inside. The lower ends 51 are gas-welded on the outside and arc-welded on the inside although I do not limit my invention in its broader aspects to welded connections or to any particular types of welds where this form of connection is employed.

The side panels B and C in the case of the sedan type of body respectively provide openings 56 and 57 for the doors, and the four main body assemblies A, B, C and D together provide the roof opening 64, best seen in Figs. 1 and 2. This roof opening is filled in with a cover structure 58 hereinafter referred to in detail.

As is apparent from Figs. 1 and 2, the body structure may be directly supported as a rigid unit by the vehicle road wheels with appropriate springing intermediate the wheels and body and I prefer, according to the illustrated embodiment of my invention, to provide a body of sufficient strength and rigidity to permit the elimination of the conventional vehicle chassis.

Referring to Figs. 1 to 3, inclusive, it may be seen that the front and rear wheel suspension mechanisms are supported on the body structure by means of sub-frames designated E and F respectively. The front sub-frame E comprises upwardly presenting channel side rails 58 and 59 and the rear sub-frame F comprises downwardly presenting channel side rails 65 and 66.

The sub-frame side rails 58, 59, 65 and 66 are tension members and are adapted to transmit a portion of their load in a novel manner to the main body structure, the latter receiving the major portion of the total load directly at the points of body support for distribution of the stresses throughout the truss-like body structure.

Thus, each front steering ground wheel is sprung in any desired manner as by the leaf spring 68 associated with the front axle 69 as shown in Figs. 1 and 4. These springs 68 are respectively connected to the rails 58 and 59 at the forward and rear ends preferably at or close to points where main compression members of the body frame join the rails whereby the major portion of the stresses passes directly to the main body structure. Likewise the rear driving ground wheels are connected through rear supporting springs 71 shown in Figs. 2 and 10 to the rails 65 and 66 at or adjacent to points of load distribution to the main body structure. Other well-known or suitable forms of wheel springing may be employed as desired within keeping of the spirit of my invention.

Referring now to Figs. 1 and 4, I will describe the details of the connections between one of the front springs 68 and the sub-frame, it being understood that the body structure is for the most part symmetrical about the longitudinal vertical central plane through the vehicle. The forward end of spring 68 as best seen in Fig. 1 is pivoted to a supporting shackle bolt 72 carried between the spaced downwardly extending flanges of the shackle bracket 73. This bracket has an upwardly extending body portion fitting within the front terminal end portion of the rail 58, the latter being inverted U-shaped at this point.

The load due to the upward thrust of the spring 68 at the bracket 73 is transmitted generally upwardly and rearwardly through the cowl beam structure as will be presently made apparent.

Rearwardly of the front of the front spring connection the side rails 58 and 59 are rectangular in cross section as shown in Fig. 4. In this figure and in Fig. 1, the rear suspension for the front springs 68 is shown, the suspension comprising a swinging shackle 85 supported by the rails 58 and 59, and mounting the usual spring eye at the rear end of the spring 68.

Fig. 4 also shows how the front shock absorbers 76 are mounted. These shock absorbers are of the well-known direct acting type and comprise a pair of telescoping members, one of which is directly connected to the axle 69 by a bolt 79. The other member is connected directly to the cowl panel member 101 through the intermediary of a bolt 80 and a bracket 81, the latter being riveted to the flange 82 of the panel 101. It will thus be seen that the thrust transmitted through the shock absorbers 76 is passed upwardly and rearwardly of the body proper through the cowl beam structures which will be presently described.

Figure 10:
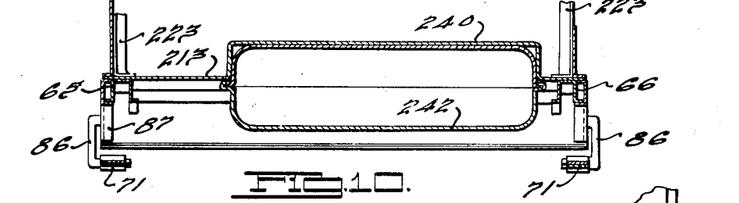
Fig. 10 is a section along the line 10—10 of Fig. 2.

The typical rear spring 71, best shown in Figs. 2 and 10, has its rear end supported from the rear end portion of the rail 65 by a swinging shackle 86, the upper end, as best seen in Fig. 10, being mounted between the downwardly extending portion 87 of the shackle bracket 89. This bracket has a flange 88 bolted at 90 to the rail 65.

Returning now to the details of construction of the body front section A best shown in Fig. 1 and the detailed sectional views noted thereon, this front section comprises a pair of stamped sheet metal cowl side panels 101. These cowl panels form the outer panel shell or metallic skin of the engine enclosure (the engine not being shown) or hood structure forwardly of the transverse dash 102. The cowl panels 101 also form one member of the respective hollow cowl beams for the front body section in the following manner.

Each of the cowl panels 101 illustrated in Fig. 4 has a flanged forward downwardly extending terminal portion 103 which is secured to a mating edge portion 104 of the inner cowl panel or shell member 105 by welding. The shell 105 is welded to the outer surface of the web of bracket 67 and has an opening 70 to receive a mounting pin for supporting the vehicle motor.

The inner and upper marginal edge of each cowl panel 101 is return bent to provide a channeled shelf 108 for supporting a hood cover (not shown) adapted to pivot at its rear opposite sides by pivot bearings carried by the cowl portion 162.

The marginal edge of the shell 105 nests with panel 101 along the curvature of the wheel house as indicated at 112, the engaging surfaces being welded.

Secured to each of the cowl beam structures is a transverse brace member 119 which serves to brace the front body structure A at the forward end and to increase the rigidity thereof.

To complete the substantially triangular hollow cowl beam and to provide a housing for a front wheel, each cowl panel 101 has its other marginal edge turned inwardly to provide a flange 123 which is adapted to engage a fender (not shown).

The lower arched portion 127 of the reinforcing panel 105 has a flange 128 turned inwardly at the bottom thereof and welded to the rail 58 to form a box section as shown in Fig. 4. The panel 105 is also provided with an edge 129 which defines an opening through which access may be had to the motor compartment. A cover 126 is adapted to be removably attached to the edge 129 by bolts 130. The cover 126 is provided with louvers for admitting air to the engine compartment.

As stated above, the forward portions of the side rails 58 and 59 are formed in rectangular shape by welding to the flange 128 of the panel 105 and the forward ends thereof are braced by a cross member 135 welded in place to each rail.

It will be apparent that the hollow cowl beams, best seen in cross section in Fig. 4, present rigid main compression beams or columns which are loaded at their lower ends at the respective shackle brackets 73, the component panel and shell members receiving the load directly from the front ends of the front springs 68 for transmission through the upwardly and rearwardly curving cowl beams to distribute the stresses through the body structure as will be presently apparent.

Secured to the chassis rails 58 and 59 at points respectively adjacent the rear of the associated front wheel house structure is a channeled cross member 137 which serves to stiffen the front structure at this point as well as to provide a rear mounting for the vehicle motor.

As shown in Figs. 1 and 3, the outer panel 101 extends rearwardly to, and partially surrounds, the door opening 56. The inner panel 105 is welded along its rear marginal edge to a panel 140 which is joined with the outer panel 101 at the door opening. The panel 140 is provided with a channel shaped reinforcing rib 141 which extends downwardly from the windshield pillar to a point adjacent the side sill 58 to thereby strengthen the body against compressive stresses transmitted upwardly from the axle suspension mechanism.

The lower edge of the dash 102 has a rearwardly and downwardly bent marginal flange 153, best seen in Figs. 1 and 4, which extends downwardly and terminates in a flange 154 which is welded to the floor 155. A transverse reinforcing member 156 is welded to the floor 155 and to the flange 154 and, together with the flange 154, forms a transverse stiffening rib to which the rear ends of the side sills 58 and 59 are welded.

The portion of the panel 162 extending rearwardly and upwardly from the cowl portion provides the windshield frame forming portion 162$^b$ best shown in Fig. 4. This portion 162$^b$ has a glass receiving opening divided into portions 170 and 171 by a brace 172 welded at its upper end to the glass supporting marginal flange 173 bounding the openings 170 and 171. At its lower end this brace is welded to the rear of the cowl portion and to the inwardly extending front marginal flange 174 of the shelf portion 175 of the instrument panel 176. The flange 174 is welded to the lower portion of the flange 173 and the instrument panel 176 has a stiffening return bend 177 at the bottom thereof.

The rear vertical edge portion of the outer panel 101 forms the vertically extending web portion of the front door column 182. The instrument panel 176 is welded to each column 182 adjacent the end thereof as shown in Fig. 5.

Above the instrument panel the column 182 slopes rearwardly and upwardly, the inner wall of the column above the panel 105 being formed by the reinforcing insert 191 which is welded in place and extends downwardly to the bottom of the instrument panel to which it is welded.

By reason of the foregoing structure, I have provided for a transference of a part of the stress in the side rails 58 and 59 to the body frame structure adjacent the load point at the side rails where the rear of the front springs 69 are suspended by the shackles 85. This transference of the load to the body structure takes place through the shells or panels 105, 101 and 140 for distribution to the body structure by the columns 182 and also by the dash 162; also directly upwardly through ribs 141 which tie into the upper sloping portion of the columns 182. The ribs 141 and the forwardly extending hollow cowl beams including the associated stiffener flanges provide a truss-like structure in association with the side rails 58, 59 and the front door columns 182, the trussed body structure being further braced by the dash panel, instrument panel, the main shells or panels 101 and 105 and by the various structural organizations hereinbefore described in detail.

Each column 182 extends downwardly and rearwardly where the column is fabricated with the forwardly extending end of the body lower side rail 207 of each side panel B and C to rigidly join the front section A to the side panels at the aforesaid connections 50 and 51.

I have now described the details of construction of the front body section A which may be fabricated as a unitary structure adapted for welding connection to the side body panels B and C, it being understood that while, in many instances, I have described the structural details of only one side of the front structure, both sides are preferably similar.

The body right side panel B is similar in construction to the left side panel C and, for the most part, the description will therefore be limited to one of these panels.

Figure 9:
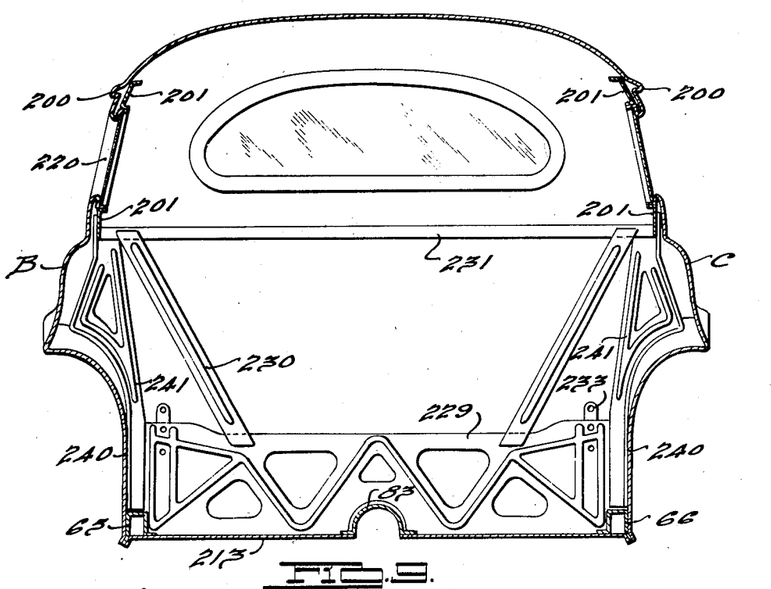
Fig. 9 is a section along the line 9—9 of Fig. 2 showing the rear portion of the body as seen from the inside thereof.

Thus, referring to the typical side panel B, best shown in Figs. 2 and 9, and the detail views noted thereon, the hollow top rail 200 projects forwardly for welding with the upwardly rearwardly extending end of the front door column 182 to provide a substantially continuous main compression member which, as will be presently apparent, continues rearwardly and downwardly to the rear end of the associated rear sub-frame rail 65, thereby forming the main upper compression member of the trussed body structure.

The top rail 200 has an inner channel reinforcing member 201, the bottom flange of which is welded to the inwardly directed flange 203 of the top rail 200. A web member 202 welded to the rail 200 and to the member 201, as shown in Fig. 12, cooperates with these members to form a hollow rigid structure.

At its forward end, the inner channel 200 is welded to the corner member 191 as shown in Fig. 5.

The upper inwardly extending marginal edge of the panel portion 200 is constructed to provide a continuation of the roof opening 64 which was previously referred to in connection with the upper panel portion of the windshield and cowl panel 162.

Figure 11:
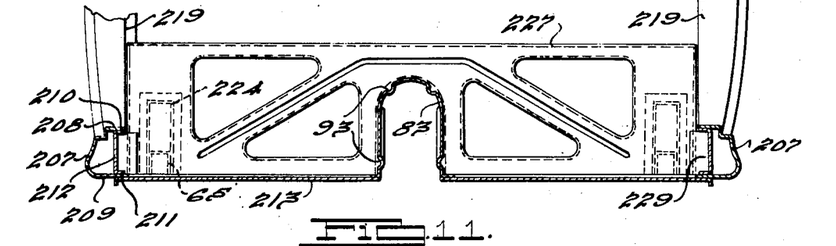
Fig. 11 is a section along the line 11—11 of Fig. 2.

At the bottom of panel B, the lower side rail 207 has its outer channel member (see Fig. 11) formed with the inwardly extending flanges 208 and 209. The side rail 207 has its inner channel reinforcing member formed with the web 212 and the inwardly extending flanges 210 and 211 welded to the corresponding flanges 208 and 209 of the outer channel member, thereby forming a strong, hollow and very light rail structure. At the forward end of the lower rail 207, the inner channel member is increased in height and deflected upwardly into overlapping relation to the inner face of panel 140 to which it is welded. The floor member 213 is welded to the flange 209 as shown in Fig. 11.

The intermediate column 212 extends vertically between the top rail 200 and the lower rail 207 and provides a vertical brace member of the truss structure, this column being hollow and comprising inner and outer welded channel members best shown in Fig. 3.

At its upper end, the column 212 is flared forwardly and rearwardly and has its outer web 213' formed integrally with the panel rail portion 200 while the inner web 214 is welded to the downwardly depending portion 215 of the inner rail member as indicated at 216.

The panel portion 200 is reinforced and braced from the top rail 201 at suitable points along the top rail, one of these braces being shown at 217 in Fig. 2. This brace is formed of a channeled member welded at its lower end to the web of rail 201 and having an upwardly extending terminal tongue welded to the under side of the flange 64 on which the roof structure is supported.

The lower end of the column 212 is formed integrally with the side rail 207 as shown in Fig. 6 and the inner web member 214 has a welded connection with a brace 218 which is welded to the floor 213 along its lower horizontal edge.

Rearwardly of the intermediate column 212, the panel B has its top rail 200 continuing downwardly around the rear of the rear wheel house structure to joint the rear end of the chassis rail 65 as will presently be apparent. Rearwardly of the rear door opening 57, the panel is provided with the rear door column 219 which is arranged to receive the load from the front end of the rear spring 71, this load being transmitted through the column to the top rail 200. The column 219 also connects the top rail 200 and the associated bottom rail to brace these parts as will presently be more apparent.

In the region of the rear window opening 220, the inner reinforcing web member 201 surrounds the window opening, as shown in Figs. 2 and 9, and is connected to a reinforcing member 221 by the member 222 thereby forming a reinforcing and stiffening structure for the rear post 219.

A compression member 223 connects the rear end of the member 201 with the rear sub-frame sill 65 as shown in Fig. 2 thereby providing means for transmitting and distributing the stresses incident to the thrust of the road wheels through the shackle 86 upwardly to the roof structure.

At the point of attachment of the forward end of the spring 71, the rail 65 is reinforced by the member 224 which is of channel form and overlies the rail as shown in Fig. 7. Rail 65, member 224 and shackle bracket 225 are all fastened to the body floor structure 213 by means of bolts 226.

As shown in Fig. 11, a transverse stiffening member 227 is provided just forwardly of the rear posts 219. This member is welded to the tabs 229 which are in turn welded to the inner webs 212 of the bottom rails 207 and has a welded flanged connection to the tunnel 83. A bent flanged portion 228 extends generally rearwardly and is welded to the member 221 as shown in Fig. 2. The member 227 forms the support for the rear seat cushion (not shown).

A seat back support member 229 extends between the rear wheel housing portions 240 of the side panels B and C, as shown in Fig. 9. The member 229 is welded to the floor 213 which is inclined upwardly at this point, to the tunnel 83, to the sills 65, 66 and to the reinforcing members 241 which are welded to the curved portion of the wheel housings, and at their tops, to the shelf 231 which extends across the body along the top of the rear seat back. A pair of brace members 230 extend between the members 229 and 231 at each side of the body and are welded in place and the shelf 231 is connected to the outer rail 200 by an angle bracket 244 as shown in Figs. 2 and 8.

The member 229 has a pair of brackets 233 rigidly fastened thereto which serve as the upper connection for the rear shock absorbers 234. The shock absorbers extend downwardly through the flexible grommet 236 and have a connection with the spring plate 239 at their lower ends. An angle bracket 235, welded to the member 229 and to the wheel housing serves as an additional strengthening member at each side of the body.

Rearwardly beyond the member 229 the floor structure 213 has a plurality of bumped portions 99, 240 and 241 which accommodate the differential housing, fuel tank and muffler respectively. The fuel tank 242 is shown in Figs. 2, 3 and 10 and comprises a pair of complementary dished sections connected together by a flanged joint as is common in the art. A pair of straps 243 are suitably attached to the floor 213 and may be tightened to retain the tank in place against the bump 240.

The rear end of the portion D sweeps downwardly to form a hollow luggage compartment in rear of the member 229 and curves inwardly at its extreme rear end 246 as shown in Fig. 2. A plate 245 welded to the bottom of the turned under portion of the rear panel and to the turned down flange of the floor 213 closes the rear of the body beyond the ends of the sills 65 and 66.

It will be apparent that I have provided a body structure wherein a truss construction is employed to resist the applied forces through definite structural members in which the primary stresses are the simple stresses of tension or compression, the severe bending stresses present in conventional types of automobile bodies and frames being largely eliminated. Thus, the longitudinally extending lower front and rear side rails and floor are in tension and the forward and rear inclined members as well as the roof portions of the top rails are in compression when a static load, due to the weight of the vehicle and passengers, is on the wheels.

The spring reactions are transmitted largely to the body structure in an improved manner, the front spring reaction and engine loads being transmitted directly through the rearwardly and upwardly inclined members of the front body section to the front door columns and top rails. The body shell or panels, in many instances, are constructed to take a portion of the loads, thereby minimizing the body weight. The chassis sills conventionally employed are thus dispensed with, and the total loads taken by the body structure.

Various modifications and changes will readily be apparent from the teachings of my invention and many changes may be made within the scope and spirit of my invention as defined in the appended claims, my invention in its broader aspects not being limited to the foregoing described illustrative embodiments.

I claim:

1. In a chassisless vehicle, a frameless body comprising a rigid structural central floor section, front and rear frames secured at one end thereof respectively to said floor section and extending forwardly and rearwardly therefrom, a pair of longitudinally extending laterally spaced hollow beam structures fixed to said front frame, each of said beam structures providing a wheelhouse, a rear body superstructure comprising side and rear panel members secured to said floor section and to said rear frame, ground wheel supporting means connected to said front frame and adapted to transmit a portion of the body supporting forces upwardly and rearwardly from said front frame through said beam structures and said superstructure.

2. In a chassisless vehicle, box shaped body side rails, a floor plate connected to each of said side rails and closing the space therebetween, a tunnel for accommodating a drive shaft disposed midway between said rails and secured to the top surface of said floor plate and a plurality of transverse brace members secured between said rails and to said floor plate and tunnel.

3. A chassisless and frameless body for vehicles comprising a front unit, side units and a rear unit, each of said units consisting of metal panel members braced by internal members secured thereto by welding, a floor member secured between the side units longitudinally centrally thereof, front and rear frames secured between the side units at the front and rear ends thereof, said frames being also secured to said floor member at the front and rear thereof, road wheel supporting means secured to said respective frames at points adjacent the ends thereof, brace members secured to said frames adjacent the points of attachment of said road wheel supporting means, said brace members extending generally upwardly toward one another, a roof member connecting said brace members, said roof member being adapted to act in compression and said floor member being adapted to act in tension to support the load of said vehicle.

4. In a chassisless vehicle body, side rails, a floor plate secured between said rails, a tunnel secured to said floor plate, an upwardly extending transversely disposed seat supporting member secured between said rails and to said floor plate and tunnel and a shock absorber attaching bracket secured to said seat supporting member at each side thereof.

5. In a chassisless vehicle body, a driver's compartment, a pair of laterally spaced hollow beam structures extending forwardly of said compartment and downwardly to form the front end of said body, road wheel supporting means including an axle member associated with said hollow beam structures and adapted to transmit at least a portion of the body supporting forces upwardly through said beam structures and rearwardly therethrough toward said compartment, each of said beam structures providing a wheelhouse, and a shock absorber connecting said axle directly with the arched wheelhouse portion of each of said beam structures.

6. In a chassisless vehicle, in combination, a body, road wheel supporting means mounted on said body, said body having side panels arched to define a rear wheelhouse at each side thereof, a horizontal shelf secured between said side panels, brace members extending downwardly from said shelf and welded to the upper contours of said wheelhouses, a seat back supporting member secured between said brace members and to the floor of said body, additional brace members secured between said seat member and said shelf and a shock absorber secured to said seat member and to said wheel supporting means at each side of said body.

7. In a motor vehicle body structure having road wheel support means mounted directly thereon, side panels at each side of said body, each of said panels having a flanged opening adapted to receive a rear quarter window, a shelf secured between said panels adjacent said window openings, a reinforcing member secured to each of said side panels around said window openings and extending downwardly therefrom in the direction of said wheel support means, and a bracket securing said shelf to said flange and reinforcing means.

8. In a motor vehicle body structure having a driver's compartment, laterally spaced side panel structures defining said compartment, a floor member secured to said side structures at the bottom of said compartment, a one piece dash panel secured between said side structures forwardly of said compartment and having an inclined portion providing a toe board for said compartment, said dash panel having a channel-shaped flange at the bottom thereof secured to said floor member, and a frame structure extending forwardly of said dash for supporting vehicle road wheels, the rear end of said frame being seated within said flange adjacent the respective side panels.

9. In a chassisless vehicle body having a driver's compartment, a pair of laterally spaced compression structures extending forwardly of said compartment and downwardly to form the front end of said body structure, a dash member secured between said compression structures forwardly of said compartment, a pair of rail members secured to said compression structures along their lower edges, said rails extending rearwardly from the front of said vehicle and terminating in a connection with the bottom of said dash, and road wheel supporting means mounted on said rails.

10. In a chassisless vehicle having a passenger compartment, a body having side panel structures and a floor member secured thereto, a dash panel secured to said side panel structures and to said floor member at the front of said compartment, a transversely disposed brace member secured to said side panel structures and to said floor at the rear of said compartment, and a tunnel for housing a drive shaft, said tunnel extending longitudinally of said compartment and being secured to said dash at its forward end, to said brace member at its rearward end and to said floor throughout its length.

ROBERT CADWALLADER.